United States Patent Office 3,605,242
Patented Sept. 20, 1971

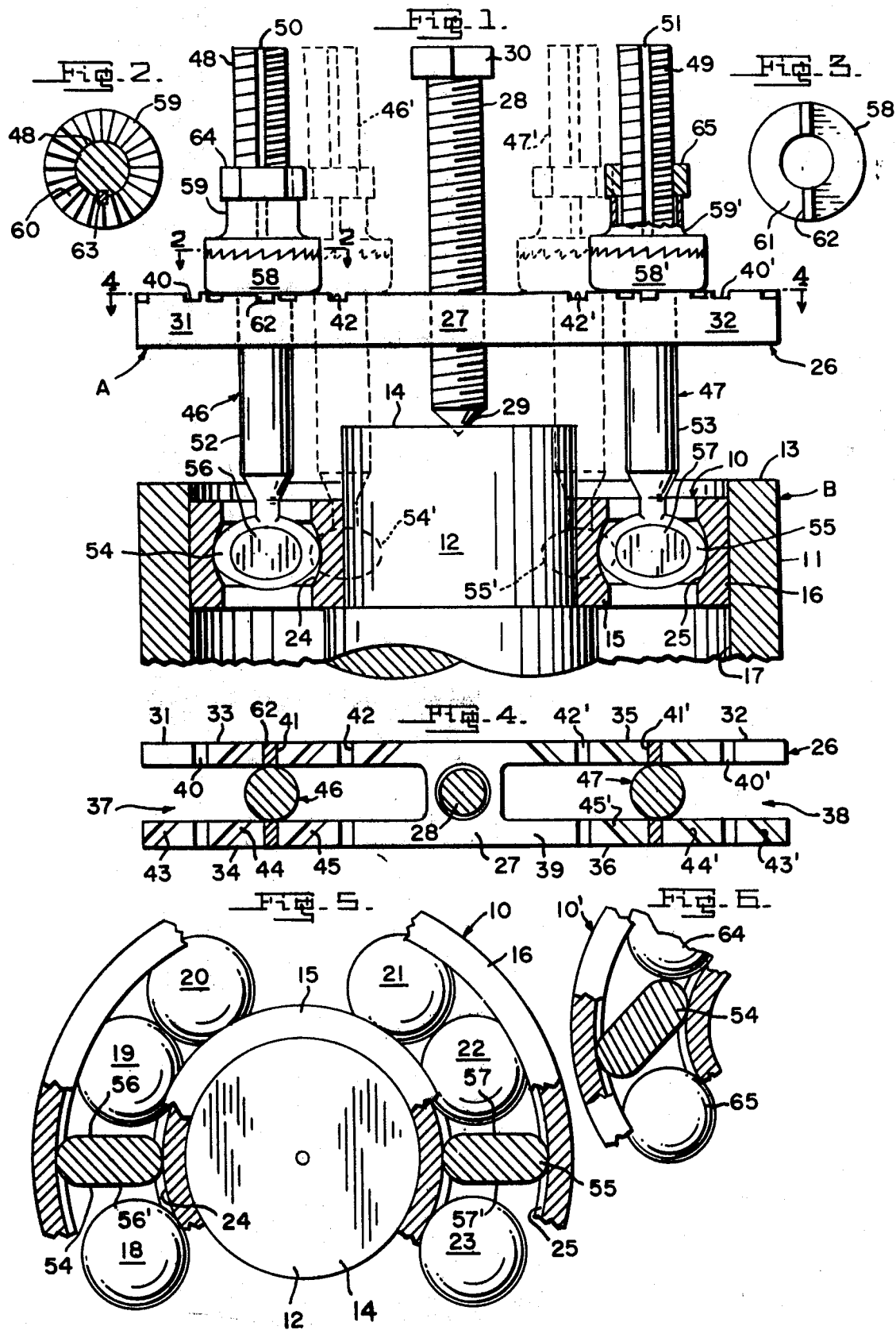

3,605,242
BALL BEARING PULLERS
Otto E. Kuffner, Box 116, Glentworth,
Saskatchewan, Canada
Filed Feb. 16, 1970, Ser. No. 11,523
Int. Cl. B23p 19/04
U.S. Cl. 29—259                            2 Claims

ABSTRACT OF THE DISCLOSURE

Disclosed is a pulling tool for removing ball bearing assemblages from shaft ends within tubular axles housings. The pulling tool includes a cross member through the central portion of which is threaded a bolt provided with a tip engageable with a shaft end coaxial with the tubular housing. The cross member has bifurcated opposite arm portions through which selected pull rods extend with provisions for adjustment radially and in the direction of the shaft axis. The pull rods are in sets of various sizes and have ellipsoidal knobs which may be brought into gripping engagement with the curved surfaces of inner and outer races of the ball bearing assemblages.

---

My invention relates to improvements in pulling tools and more particularly to tools for removing ball bearing assemblages from the ends of shafts, such as axles, that are supported for rotation within tubular housings by the bearing assemblages, thus making the bearing assemblages inaccessible except by way of the annular clearance spaces between the shafts and tubular housings, respectively.

It becomes necessary at times for the average mechanic or machinist to remove a bearing assemblage from the end of a shaft within a tubular housing regardless of the dimensions of the shaft, housing, and bearing assemblage, it being understood that the diameters of the inner and outer races and of the balls in the bearing assemblage are subject to variations depending on the particular application and design considerations.

An important object of my invention is to provide equipment for pulling ball bearing assemblages from the ends of shafts of various sizes, and which equipment is adjustable for use with bearing assemblages of different diameters and for engagement with the curved walls of the inner and outer races of the bearing assemblages regardless of variation in diameter of the balls within such bearing assemblages.

Another object of my invention is the provision of the equipment just described which is adjustable for use with ball bearing assemblages which are located on the shaft at varying distances from the end of the shaft.

Other objects and advantages of my invention will become apparent during the course of the following detailed description, taken in connection with the accompanying drawing forming a part of this specification, and in which drawing, FIG. 1 is a central longitudinal sectional view of end parts of a tubular housing and axle shaft supported therein by a ball bearing assemblage, with my improved bearing puller in operating position ready for removal of the bearing assemblage from the end of the shaft, this view showing in broken lines the position of parts adjustable for coaction with a bearing assemblage of a smaller size.

FIG. 2 is a cross sectional view of a pull rod construction forming part of my invention, the section being taken substantially on the line 2—2 of FIG. 1.

FIG. 3 is an end view of a collar forming part of the pull rod construction shown in FIG. 1.

FIG. 4 is a cross sectional view taken substantially on the line 4—4 of FIG. 1.

FIG. 5 is a view partly in end elevation and partly in cross section of the bearing assemlage and shaft shown in FIG. 1 with ellipsoidal knob portions of the pull rod construction disposed in engagement with the curved walls of the inner and outer races of the bearing assemblage.

FIG. 6 is a fragmentary view, partly in elevation and partly in cross section, of a bearing assemblage of smaller dimensions than that of FIG. 5, and showing the ellipsoidal knob portion of one of the pull rod constructions in engagement with the curved surfaces of the inner and outer races of the smaller bearing assemblage.

In the drawing which, for the purpose of illustration, shows preferred and modified forms of my invention and wherein similar reference characters denote corresponding parts throughout the views, the letter A generally designates my improved bearing pulling equipment and B, parts of a mechanism including a ball bearing assemblage, 10.

The mechanism B includes a tubular housing 11 within which an axle 12 rotatably supported by the ball bearing assemblage 10 disposed inwardly of the end 13 of the housing 11 and inwardly of the end 14 of the axle or shaft 12. The ball bearing assemblage 10 comprises an inner race 15 encircling the axle shaft 12 and an outer race 16 encircled by the inside wall 17 of the tubular housing 11, and having a series of balls 18–23 in rolling engagement with the annular curved surfaces 24, 25 of the inner and outer races 15, 16 respectively.

Referring now more particularly to FIG. 1, my bearing pulling equipment A comprises a cross member 26 disposable in spaced relation transversely of the shaft end 14, and having a central portion 27 through which a bolt 28 extends in screw threaded engagement therewith, the bolt 28 being provided with a conical tip 29 engageable with the center of the shaft end 14 upon coaxial alignment of the bolt 28 with the shaft 12 and upon inward threading of the bolt 28 by rotation of its head 30. The cross member 26 has opposite arm portions 31, 32 that are bifurcated as shown in FIG. 4 to provide parallel sides 33, 34 and 35, 36 defining longitudinal slots 37, 38 that extend inwardly from the ends of the arm portions 31, 32 to the central portion 27. Cut or otherwise formed in the outer face 39 of the cross member 26 are sets of transverse grooves 40, 40' and 41, 41' and 42, 42' at different distances from the center portion 27 as well as diagonal grooves 43, 43' and 44, 44' and 45, 45' similarly spaced from the center portion 27, the purpose of the transverse and diagonal grooves being hereinafter explained.

Extending through the slots 37, 38 of the opposite arm portions 31, 32 respectively are pull rods 46, 47 disposable in parallel relation to the bolt 28, each pull rod 46, 47 comprising a screw threaded shank portion 48, 49 having a longitudinal keyway 50, 51 and a bearing-engaging unthreaded stem 52, 53 terminating in an ellipsoidal knob 54, 55 having a major axis normal to the stem 52, 53 and shank portion 48, 49, and of a length equal to the diameter of the balls 18–23 of the given bearing assemblage 10, thus permitting the ends of the ellipsoidal knob 54, 55 to grippingly engage the annular curved surfaces 24, 25 of the inner and outer races 15, 16 upon orientation of the knob 54, 55 to a position wherein its major axis is in radial alignment with the bearing assemblage 10. This position of the ellipsoidal knob 54, 55 is shown in FIGS. 1 and 5. Preferably but not necessarily, the opposite sides of the ellipsoidal knob 54, 55, may be formed by parallel flat surfaces 56, 56' and 57, 57' in order to provide knobs 54, 55 of reduced width and facilitate insertion of the ellipsoidal knobs 54, 55 in spaces between balls 18, 19 and 22, 23, which spaces, depending on the design of various bearing assemblages, may be rather small and barely permit insertion of the ellipsoidal knobs therebetween.

Each pull rod 46, 47 has its shank portion 48, 49 encircled by longitudinally slidable first and second collars 58, 58' and 59, 59' whose abutting faces, such as face 60 of collar 59, shown in FIG. 2, are serrated and in ratcheting engagement as shown in FIG. 1. The first or inner collars 58, 58' have bases such as base 61 of collar 58, shown in FIG. 3, and are each provided with a diametrical ridge or key 62 capable of seating in a groove, such as groove 41, in the outer face of the cross member to secure the first collars 58, 58' against rotation.

Securing the second collars 59, 59' against rotation while permitting longitudinal movement thereof on the threaded shanks 48, 49 are keys, such as key 63, shown in FIG. 2, that are seated in the longitudinal keyways 50, 51. I provide a pair of nuts 64, 65 in screw threaded engagement with the threaded shanks 48, 49 which nuts 64, 65 are engageable with the second collars 59, 59' to permit adjustment of the effective lengths of the stems 52, 53 whereby the ellipsoidal knobs 54, 55 may be inserted into diametrically opposite parts of the bearing assemblage 10 between the inner and outer races 15, 16 thereof.

In order to facilitate work on different sizes of bearing assemblages 10, I provide one or more additional sets of pull rods 46', 47' with ellipsoidal knobs 54', 55' of different sizes, it being understood that in practice I select pull rods with ellipsoidal knobs whose major axes correspond to the diameter of balls contained in the bearing assemblage on which work is being done. Alternatively, I may adjust the angular relationship of the first collars 58, 58', to the arm portions 31, 32 of the cross member 26 by shifting the ridges or keys, such as ridge 62 thereof relative to the transverse and diametrical grooves so that the ellipsoidal knobs 54, 55 may be brought into gripping engagement with the curved surfaces of inner and outer races as shown in FIG. 6 wherein the length of the major axis of the ellipsoidal knob 54 is somewhat greater than the diameter of the balls 64, 65 of the bearing assemblage 10'.

It will be understood that the pull rods 46, 47 are adjustable in the longitudinal slots 37, 38 of the opposite arm portions 31, 32 of the cross member 26 toward and away from the central portion 28 depending on the diameter or radius of the annular space between the inner and outer races 15, 16 of the bearing assemblage 10.

In the operation of my improved equipment A, assuming that the parts have been adjusted relative to the shaft end 14 and bearing assemblage 10 as shown in FIG. 1, it is only necessary to tighten the bolt 28 as by turning its head 30 with a suitable wrench (not shown, and the resultant movement of the cross member 26 away from the shaft end 14 will draw equally on the pull rods 46, 47 and cause the bearing assemblage 10 to slide off the shaft 12.

I claim:

1. A tool for removing a given ball bearing assemblage from a shaft having an end, said tool comprising a cross member disposable in spaced relation transversely of the shaft end, said cross member having a central portion and opposite arm portions, a bolt threaded through said central portion for abutment against and for disposition in axial alignment with said shaft, a pair of pull rods disposable in parallel relationship to said bolt and each slidably passing through a different one of said opposite arm portions, said pull rods each comprising a screw-threaded shank portion having a longitudinal keyway and a bearing-engaging ellipsoidal knob portion having a major axis normal to the shank portion, and of a length equal to the diameter of the balls of said bearing assemblage, each shank portion being encircled by longitudinally slidable first and second collars having abutting faces in ratcheting engagement, said cross members each having a transverse groove, at a predetermined distance from said central portion, each being provided with a key releasably securing said first collars against rotation relative to the transverse grooves of said cross members and said second collars each being provided with a key slidable in a different one of said longitudinal keyways, and a pair of nuts each threaded on a different one of said shank portions and each rotatable into engagement with a different one of said second collars.

2. A tool as defined in claim 1, in which the opposite arm portions of said cross member are bifurcated whereby longitudinal slots are provided each in a different one of said arm portions, said pull rods passing through said slots and being disposed at any one of a number of different distances from said central portion, and said arm portions are each provided with additional transverse grooves at distances from said central portions different from said predetermined distance whereby said tool may be adjusted for removing a ball bearing assemblage of a radius different from that of said given assemblage.

References Cited

UNITED STATES PATENTS

| | | | |
|---|---|---|---|
| 1,670,573 | 5/1928 | Howell | 29—259 |
| 1,692,469 | 11/1928 | Rex | 151—41X |
| 2,992,478 | 7/1961 | Baker | 29—259 |

WILLIAM S. LAWSON, Primary Examiner

L. GILDEN, Assistant Examiner

U.S. Cl. X.R.

29—263